June 18, 1963 J. A. BUCKBEE ETAL 3,094,644

ELECTRICAL STORAGE DEVICES

Filed Oct. 28, 1959 2 Sheets-Sheet 1

INVENTORS
JOHN A. BUCKBEE
ALBERT J. CLOUTIER

BY H. Vincent Harsha
ATTORNEY

ELECTRICAL STORAGE DEVICES

Filed Oct. 28, 1959 2 Sheets-Sheet 2

INVENTORS
JOHN A. BUCKBEE
ALBERT J. CLOUTIER
BY H. Vincent Harsha
ATTORNEY

United States Patent Office 3,094,644

Patented June 18, 1963

3,094,644

ELECTRICAL STORAGE DEVICES

John A. Buckbee, Wellesley, and Albert J. Cloutier, Natick, Mass., assignors to Raytheon Company, Lexington, Mass., a corporation of Delaware Filed Oct. 28, 1959, Ser. No. 849,287
17 Claims. (Cl. 315—12)

This invention relates to electrical signal storage and read-out devices and, more particularly, to such devices known as storage tubes in which an electron beam places a charge pattern representative of said signals on a non-conductive electrode and said electrode modulates another beam during a read-out.

In the past, storage tubes of the aforesaid type have been employed in radar display systems to store a given radar picture. They have also been employed to store digital signals for use in a digital computer. In these applications a single gun storage tube is often employed for storing a picture or signals during a storage or write cycle and this picture may remain stored for long intervals or may be read many times during read cycles before erasure. In a single gun tube the erasure is often accomplished during an interval at least as long as the write cycle and during this erasure interval neither write-in nor read-out can be accomplished. In such applications where a two-gun storage tube is employed, one gun is denoted the write gun and the other is denoted the read gun. Both guns operate simultaneously, often at different scan rates, the write gun placing the charge pattern representing a picture on the non-conductive electrode and the read gun reading said picture. Here again erasure is accomplished by the write beam and requires an interval equal to a normal write-in interval. One and two-gun storage tubes operating in these manners are described in U.S. Patents 2,713,648 and 2,547,638 to B. C. Gardner.

For some applications of one and two-gun storage tubes, such as described in the reference patents, it is desirable to slowly erase storage signals over the interval of many repeated read-out cycles so that the amplitude of the read-out signals steadily decreases. For example, where the storage signals are video comprising a radar for TV raster representing an animated scene, this scene may be read-out at a rate different from the write-in rate and applied to a display. It is desirable that moving objects in the display be followed by a trail of fading images representing previous positions of the objects. Consequently, it is desirable that each stored raster fade gradually and disappear from storage after a given period of time so that the most recently stored rasters will stand out in sharp contrast in the display to earlier stored rasters of diminishing contrast. In the past this effect has been accomplished by partially erasing the stored rasters at regular intervals such as, for example, following every write cycle. In the single-gun storage tube during the interval when erasure is accomplished, neither write-in nor read-out can occur and when a two-gun storage tube is employed write-in cannot be accomplished during erasure. This results in a certain loss of information particularly where objects in the picture move rapidly.

Therefore, it is one object of the present invention to overcome the above-mentioned limitations of prior systems employing one and two-gun storage tubes.

It is another object of the present invention to provide means for splitting the read-gun electron beam, in a storage tube such as described in the references, into two currents and employ one as the output video signal and the other for erasing stored signals.

It is another object to accomplish the above-mentioned erasure simultaneously with the read or the write cycles and preferably simultaneous with the read cycle.

It is another object to employ a two-gun storage tube such as described in the reference patents in conjunction with suitable circuits to cause erasure of the stored picture by the action of the read beam while said picture is being read.

It is another object to provide means for varying the degree of erasure which occurs each time the picture is read.

In commercial television it is often desirable that the scan rates of local receiver kinescopes be locked to the frequency of the local power. This creates problems where the received video is at a different scan rate from the local power frequency. In the past this problem has been avoided by locking the scan rate of the television receiver to the rate of the received video, thus making no use of the local power frequency. For example, where video is transmitted at a rate of 60 half rasters a second (each half raster consisting of alternate lines which are interlaced to form a complete raster each 1/30 of a second) the local power frequency where the television receiver is located may be 59.9 cycles a second and is, thus, totally unsuitable for driving the display of the receiver. One embodiment of the present invention contemplates a device for solving this problem rather than avoiding it by converting a television picture received at one scan rate into an equivalent picture at another scan rate which is preferably in synchronism with local power frequency. Consequently, it is another object of the present invention to employ a two-gun storage tube, such as described in the reference patents, with means for controlling voltages applied thereto such that complete erasure is accomplished each time the read beam scans the stored picture, thereby providing the above-mentioned conversion.

It is a feature of the present invention to provide a device for storing and subsequently reading electrical signals, said device including an electrical storage target with means providing storing and reading beams scanning opposite sides thereof, second target means for intercepting said reading beam when said storage signals are read and thereupon admitting secondary electrons with means coupled to said targets for varying the voltage differential therebetween so that the number of scans of said reading beam required to cancel said stored electrical signals is varied.

It is a further feature of this invention that said electrical storage target have an electrically conductive side and a non-conductive side and that said reading beam scan the conductive side thereof and said storing beam scan the non-conductive side thereof and, furthermore, to dispose said second target to intercept said reading beam before said reading beam strikes said storage target, to fix the voltage on the storage target to a relatively low value and to apply a variable positive voltage to said second target, increases in said variable positive voltage serving to reduce the degree of erasure and decreases in said variable voltage serving to increase the degree of erasure accomplished during each scan of the storage target by the reading beam.

Other and further features and objects of this invention will be more apparent from the following specific description of embodiments of this invention taken in conjunction with the drawings in which.

Figure 1:
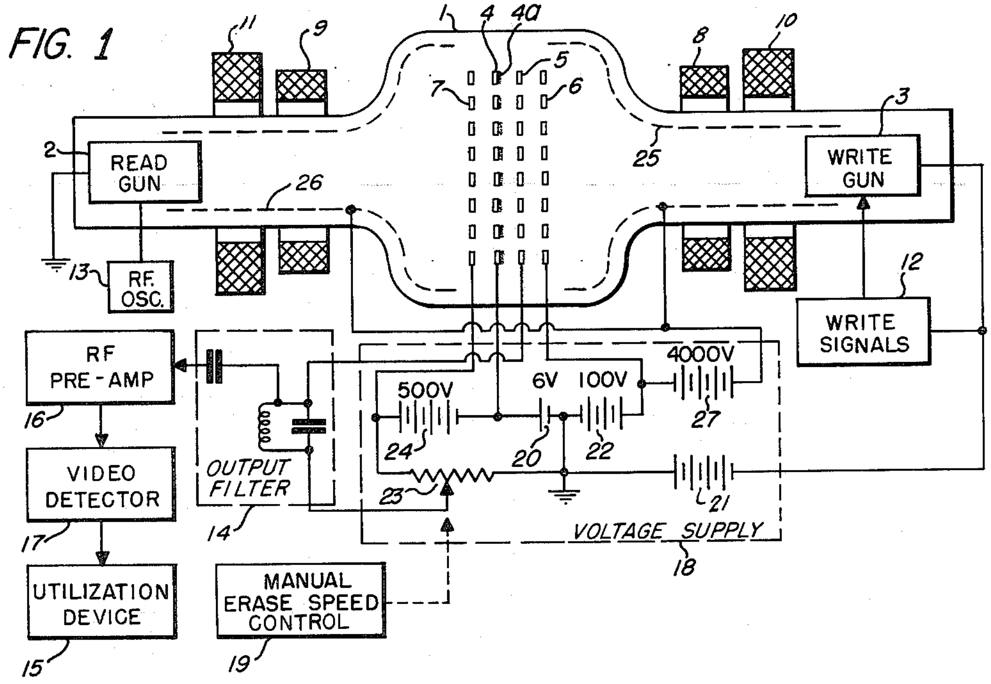
FIG. 1 depicts a two-gun storage tube having a storage target adjacent to a collector electrode with decelerating electrodes on either side for decelerating the read beam and the write beam with means coupling thereto for varying erase speed.

Turning first to FIG. 1 there is shown a two-gun storage tube 1 with a read electron gun 2 and a write electron gun 3. This storage tube operates in much the same manner as the two-gun storage tubes described in the reference patents. In principle, the tube contains a storage target 4 consisting of a fine mesh screen having a dielectric or a non-conductive surface 4*a* coating one side disposed towards the write gun 3. The tube also contains a collector electrode 5 which is preferably a fine mesh screen, from which the video signal is obtained during read out. The other electrodes 6 and 7 disposed between the storage and collector electrodes 4 and 5 and the read and write guns, respectively, serve to decelerate and collimate the beams from the write gun and the read gun. The write gun beam is caused to scan by the field from sweep coil 8 and the read gun beam is caused to scan by the field from sweep coil 9. Focussing of each of the beams is accomplished by focussing coils 10 and 11.

In operation of a storage tube of this type, video signals from an input 12 control the cathode of write gun 3 so that a beam of varying intensity issues therefrom and strikes the non-conductive or dielectric surface of storage electrode 4 causing secondary electrons to be emitted therefrom, the number of said secondary electrons being a function of the intensity of the beam. These secondary electrons are collected by collector electrode 5 and an electron picture is therefore stored on the dielectric which represents the video signals output from input 12. In the meanwhile, a beam from read gun 2 approaches storage electrode 4 and depending on the electron charge stored by the dielectric surface 4*a*, a greater or lesser portion of this electrode beam will pass through the storage electrode and impinge on the collector electrode 5 causing a varying current to flow from electrode 5 to ground. This varying current is, of course, a measure of the electron charge stored in dielectric 4*a* as it is scanned and, consequently, is a video signal describing the picture stored therein. It has been found convenient to modulate the beam from read gun 2 with an RF signal and to detect the RF frequency in the output from collector electrode 5. For this purpose, RF oscillator 13 controls the intensity of the beam from read gun 2 and output filter 14 couples the signal from collector electrode 5 to a suitable utilization device 15, via an RF preamplifier 16 and video detector 17.

As already mentioned above with reference to prior systems, the stored electron picture may be periodically erased during a write cycle in which case no video signals are applied to the write gun 3 during one cycle of its operation and suitable voltages are applied to the electrodes for insuring the deposit of an even distribution of charge throughout the dielectric coating 4*a*. It is the purpose of the present invention to avoid the necessity of setting aside a complete write cycle to accomplish this erasure and for this purpose, special voltage supply 18 with manual erase speed control 19 coupled thereto is employed for imposing suitable voltages to the electrodes. As is shown by voltage supply 18, a relatively low positive voltage, such as for example 6 volts, from battery 20 is applied to the conductive part of storage electrode 4 while at the same time the cathode of write gun 3 is preferably at minus 400 volts by virtue of coupling to battery 21 and accelerating electrode 6 is placed at plus 100 volts by coupling to battery 22. Meanwhile, collector electrode 5 is D.C. coupled via output filter 14 to potentiometer 23 which is mechanically positioned by erase speed control 19. Potentiometer 23 functions as a voltage divider and is coupled across 6 volt battery 20 and a 500 volt battery 24 and, consequently, any voltage between 0 and plus 500 volts may be applied to collector electrode 5 by adapting erase speed control 19. Accelerating electrodes 6 and 7 for accelerating the write gun and the read gun, respectively, are coupled to 100 and 500 volt batteries 22 and 24, respectively. Surfaces 25 and 26 are aquadaged in tube 1 and preferably maintained at a very large positive potential. For this purpose 4,000 volt battery 27 is coupled to the surfaces.

Figure 2:
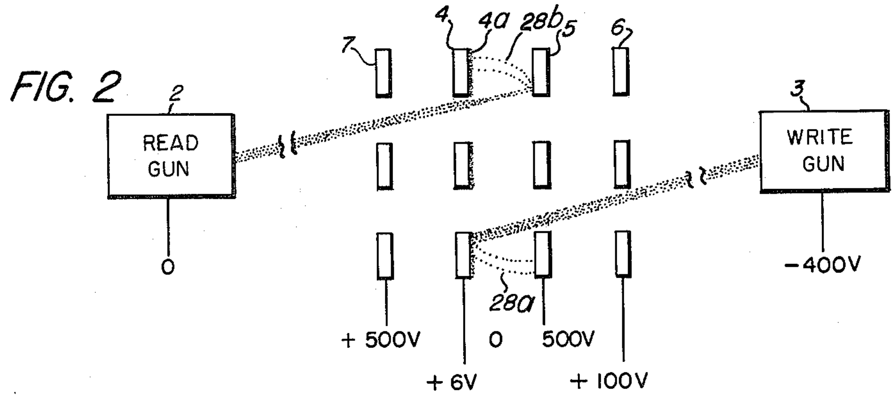
FIG. 2 is a diagram describing the principles of operation of a system in FIG. 1.

Turning to FIG. 2 there is shown an enlarged representation of the presumed action and flow of electrons at the electrodes resulting from the read and writing electron beams impinging thereon. In operation, the write gun cathode at minus 400 volts emits a stream of electrons, most of which are passed through decelerating electrode 6 and collector electrode 5 and impinge on the dielectric surface 4*a* which, in turn, emits secondary electrons and these secondary electrons are collected by collector electrode 5. Since the beam from write gun 3 is modulated by video, a variable number of secondary electrons 28*a* will be emitted from dielectric surface 4*a* as the beam from gun 3 scans out a raster of video thereon, and the charge at different spots on the dielectric surface will vary from a minimum of 0 volts to a maximum of approximately 10 volts.

In the meantime, a beam of electrons from read gun 2 whose cathode is at ground potential is accelerated and passes through electrode 7, to storage electrode 4 and, depending on the charge stored at the different spots on dielectric surface 4*a*, different portions of this beam will pass through storage screen 4 and impinge on collector screen 5. Consequently, the intensity of the beam from gun 2 which impinges on collector electrodes 5 will be modulated by the charge on dielectric surface 4*a* as the beam from gun 2 scans out a raster on that surface. The read gun beam is then effectively split into two parts, one part generating a current in electrode 5 which represents stored picture video and the other part erasing the stored charge on dielectric surface 4*a*. This is accomplished as follows: Upon striking collector electrode 5 at a voltage variable up to 500 volts, the modulated portion of the beam from read gun 2 will generate a current in electrode 5 which will represent video of the picture stored therein at a scan rate established by the scanning rate of the beam from read gun 2. This impingement of the read beam on collector electrode 5 will cause secondary electrons to be emitted therefrom and some of these secondary electrons, denoted 28*b*, have energies equal to the incident primary beam and it can be reasonably assumed that they will reach the dielectric surface 4*a* and erase the positive charge stored therein.

Figure 3:
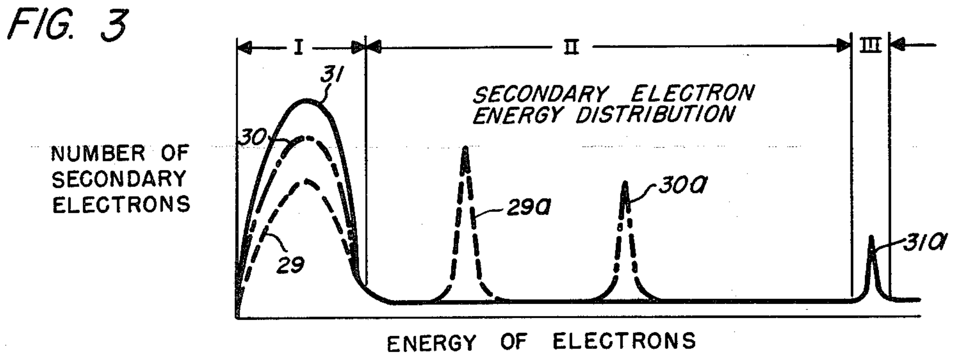
FIG. 3 shows energy distribution curves of secondary electrons emitted from the collector target for three different collector voltages.

Turning next to FIG. 3 there is shown an energy distribution curve of secondary electrons emitted from collector electrode 5 for different collector voltages. The family of three curves shown in FIG. 3 and represented as broken line 29, dot-dash line 30 and solid line 31 represent the energy distribution of secondary electrons emitted from collector electrode 5 for increasing electrode voltages. As can be seen from the curves in FIG. 3 the distribution of electron energy at relatively low energy is similar for each of the three collector electrode voltages and varies somewhat only because more secondary electrons are emitted at the higher voltage (the solid curve) than at the low voltage (the broken curve). However, at the higher energy levels, distinct and separate peaks in each of the three curves occur indicating that large numbers of electrons are emitted at different narrow energy bands for each of the voltages. Furthermore, this narrow energy band for the lowest electrode voltage includes appreciably more secondary electrons than for the higher voltages.

Consequently, peak 29a in low voltage curve 29 is higher than peak 31a in high voltage curves 31.

The shapes of these energy distribution curves can be accounted for as follows: Generally speaking, secondary electrons can be classified in three classes denoted I, II, and III. For example, class I secondaries include no primary beam electrons but only low energy secondary electrons, thereby accounting for the similar coincident peaks in the distribution curves of the three different voltages. Class II secondary electrons include many primary electrons resulting from inelastic collision. Therefore, these class II electrons have energies varying over a wide range extending to a considerably higher level than the pure secondary electrons included in class I. Finally, class III includes only primary electrons resulting from elastic collisions and consequently, electrons in this group are at a high energy level approximately (or exactly) equal to the voltage on the collector electrode. The energy ranges of these three classes are shown in FIG. 3 with reference to distribution curve 31 only. As shown, class I includes the greatest number of electrons all falling within a somewhat symmetrically shaped distribution curve; class II includes a rather even distribution of electrons over a wide range of energies and class III is represented by a sharp spike of high energy electrons.

It is one of the purposes of this invention to accomplish erasure by effectively flooding the dielectric storage surface 4a with electrons emitted from collector electrode 5. Since the electrons striking collector electrode 5 have an energy equivalent to the voltage differential between the voltage on collector electrode 5 and read gun cathode voltage (ground) and since secondaries emitted from electrode 5 must travel back to storage electrode 4 which is at about the same potential as the read gun cathode, it is evident that only those secondary electrons resulting from elastic collision of the read beam on collector electrode 5 will have sufficient energy to make the return trip and thereby erase the charge picture stored on dielectric surface 4a. Furthermore, the current of these high energy secondary electrons will vary depending on the current of the electron beam from gun 2 which strikes collector electrode 5. If the voltage on electrode 5 is large with respect to storage electrode 4, energy distribution of electrons emitted therefrom will be essentially as described by curve 31 and only a small current of these secondary electrons will have sufficient energy to reach dielectric surface 4a and, consequently, the degree of erasure will be small. On the other hand, if the voltage on collector electrode 5 is only a few volts greater than the voltage on storage electrode 4 then the distribution of secondary electrons emitted from electrode 5 will be substantially as shown by distribution curve 29 and the current of secondary electrons having sufficient energy to travel from electrode 5 back to dielectric surface 4a will be large and, therefore, erasure will be complete. It should be noted that where the voltage differential between electrodes 4 and 5 is large, the majority of secondary electrons emitted from electrode 5 are class I electrons and do not have sufficient energy to travel back to the dielectric surface 4a and will merely fall back to collector electrode 5 having no effect. On the other hand, when the voltage differential is quite small, the energy difference between elastic collision secondaries (class III electrons) and true secondaries (class I) is negligible and, consequently, many class I secondaries will also travel back to dielectric surface 4a.

Figure 4:
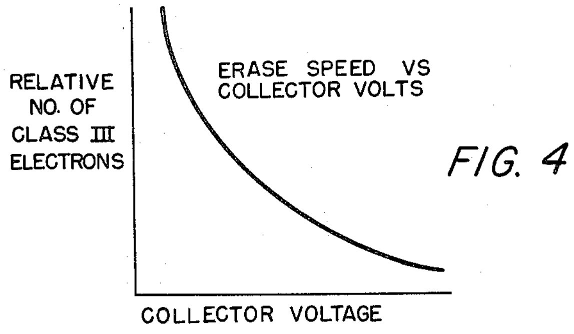
FIG. 4 is a curve of relative erase speed versus collector voltage in which erase speed is proportional to the number of secondary electrons resulting from elastic collision.

Turning next to FIG. 4 there is shown a plot of the relative number of class III electrons as a function of collector voltage. This plot might also be called erase speed versus collector voltage since it is the number of class III electrons which determines the degree of erasure accomplished during each scan of the read gun beam and if these scans are continually occurring, then it can be said that the relative number of class III electrons is representative of erase speed and inversely representative of erase time. Obviously, from FIG. 4, erase speed can be increased by decreasing the voltage differential between electrodes 4 and 5. In fact, a differential can be obtained at which complete erasure of the stored electronic signals on dielectric surface 4a is accomplished during each scan of that surface by the beam from read gun 2.

Figure 5:
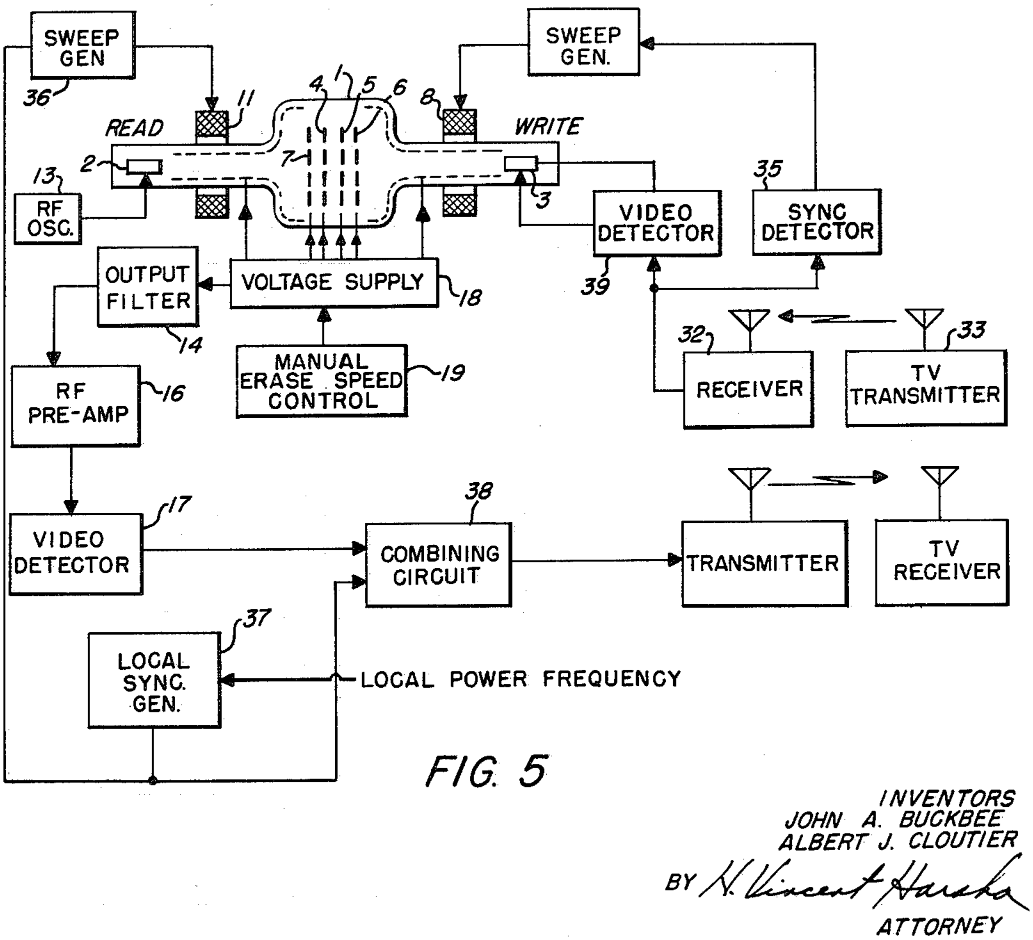
FIG. 5 depicts one use of the system shown in FIG. 1 for converting television video at one sweep rate into video at another sweep rate.

Turning next to FIG. 5 there is shown one utilization of the system shown in FIG. 1 operating in accordance with the principles described above with reference to FIGS. 1, 2, 3 and 4. This system in FIG. 5 effectively stores successive rasters of a typical television picture such as might be transmitted to home receivers and reads the stored picture at a different sweep rate, thereby creating video suitable for said different sweep rate. Such a conversion of video at one sweep rate to video of another sweep rate may be desirable where, for example, the local power frequency is different from the sweep rate of the received video picture. The system includes a storage tube 1 having its electrodes coupled to voltage supply 18 with manual erase speed control 19 coupled to said voltage supply, an output filter 14 coupled to voltage supply 18 and also coupled to electrode 5 with a suitable RF preamplifier amplifying the output of filter 14 and feeding signals to video detector 17. This part of the system shown in FIG. 5 operates exactly as the system already described in detail with reference to FIG. 1. In operation, signals are received by receiver 32 from transmitter 33, each having suitable antennas attached, and the output of receiver 32 is applied to video detector 32 and to sync detector 35. Sync detector 35 extracts sync signals in the output of the receiver and applies them to a sweep generator which controls deflection coils 8 causing the beam from write gun 3 to scan a raster in synchronism with the scan rate of the received video. The received video from detector 39 controls the intensity of the beam from the write gun 3 and, consequently, the received video raster is stored on the dielectric surface 4a of storage screen 4. Meanwhile, deflection coil 11 is energized by sweep generator 36 which is controlled by the output of a local sync generator 37 causing the beam from read gun 2 to scan storage screen 4. At the same time, the current flow to collector electrode 5 is detected and applied to filter 14 whose output is amplified by preamplifier 16 and the video content therein is detected by video detector 17. This video is in synchronism with local power frequency since the local sync generator 37 is subject to local power frequency.

The output of sync generator 37 and video detector 17 are combined in combining circuit 38 to yield a composite of video suitable for energizing the video circuits of a kinescope or for control of a transmitter or any other useful purpose. For example the output of circuit 37 might be applied to a local TV transmitter, in which case it is preferable that the local transmitter transmit only to receivers subject to the same local power frequency. Obviously, other uses could be made of the present invention in addition to the one use described with reference to FIG. 5. For example, use could be made in a radar system having some sort of a display such as a PPI cathode ray tube display which presents a number of targets and in which it is desirable to also display target history or past position as a tail on each target. In such application where all targets move very slowly, it may be desirable to maintain a longer history by erasing very slowly, in which case a large collector electrode voltage is desirable. On the other hand, where the targets move very rapidly it may be desirable to retain only a short history of the target motion in which case a relatively fast erasure time is desired which can be accomplished by maintaining a relatively low collector electrode voltage in the storage tube.

There are obviously many other uses of a storage tube operated and controlled as described in this invention and while one embodiment is shown employing a four electrode storage tube with electrode potentials provided by batteries and means for varying potential on one electrode, it is to be understood that this is made only by way of example and that any suitable voltage supply could be substituted therefor without deviating from the spirit or scope of the invention as set forth in the accompanying claims.

What is claimed is:

1. In combination with an electron storage device having storage and collector electrodes, a signal output coupled to said collector electrode and provided with sources of electron beams for writing and reading signals therein, means for causing said beams to scan said storage electrode, means for energizing said electrodes at voltages positive with respect to the voltage of the source of said read beam and means for varying the voltage differential between said electrodes simultaneously producing said signals at said output and cancelling said signals written therein by varying electron flow from said collector electrode to said storage electrode.

2. In combination with an electron storage device having a storage electrode for storing input signals and a collector electrode producing output signals and provided with electron beam generating means for scanning one side of said storage electrode to store signals therein and for scanning the other side of said storage electrode to produce a beam modulated by stored input signals which impinges on said collector electrode, means for energizing said electrodes at voltages positive with respect to the voltage of the source of said beam which scans said other side, means for decreasing the voltage differential between said electrodes simultaneously producing said signal output while increasing electron flow from said collector electrode to said storage electrode erasing said signals stored therein.

3. In combination with an electron storage device having a storage electrode for storing input signals and a collector electrode producing output signals and provided with electron beam generating means for scanning one side of said storage electrode to store signals therein and for scanning the other side of said storage electrode to produce a beam modulated by said storage signals which impinges on said collector electrode, means for splitting said modulated beam into two parts, one part being collected by said collector electrode and representing output signal and the other part falling on said storage electrode erasing signals stored therein comprising means for energizing said electrodes at voltages positive with respect to the voltage of the source of said beam for scanning said other side, and means for producing a voltage differential between said electrodes to determine the magnitude of said beam falling on said target electrode.

4. A device for storing and subsequently reading electrical signals including an electron storage target with means providing electron beams for scanning both sides thereof, second target means for intercepting one of said beams when said stored signals are read, means for energizing said targets at voltages positive with respect to the voltage of the source of said one beam, and means coupled to said targets for decreasing the voltage differential therebetween to increase electron flow to said storage target erasing electrical signals stored therein.

5. A device for storing and subsequently reading electrical signals including an electron storage target with means providing electron beams for scanning both sides thereof, second target means for intercepting one of said beams when said stored signals are read simultaneously producing output signals and emitting secondary electrons, means coupled to said targets for energizing said targets at voltages positive with respect to the voltage of the source of said one beam and for decreasing the voltage differential between said targets to increase the number of said secondary electrons having sufficient energy to travel to said storage target and cancel said stored electrical signals.

6. An electron storage device including an electron storage target with means providing electron beams for scanning both sides thereof, second target means having suitable secondary emission characteristics for intercepting one of said beams when said stored signals are read and thereupon emitting secondary electrons at least a portion of which result from elastic collision of said one beam on said second target, means coupled to said targets for energizing said targets at voltages positive with respect to the voltage of the source of said one beam, and for producing a voltage differential between said targets so that the number of scans of said one beam required to cancel said stored electrical signals is determined.

7. A device for storing and subsequently reading electrical signals including an electron storage target with means providing electron beams for scanning both sides thereof, second target means for intercepting one of said beams when said stored signals are read and emitting secondary electrons a portion of which result from elastic collision of said one beam on said second target, means coupled to said targets for energizing said targets at voltages positive with respect to the voltage of the source of said one beam and for producing a voltage differential between said storage target and said second target to control the current of said portion of secondary electrons which flow to said storage target cancelling said stored electrical signals as said stored signals are read.

8. A device for storing and reading electrical signals including an electron storage target with means providing storing and reading beams scanning opposite sides thereof, second target means for intercepting said reading beam when said stored signals are read and emitting secondary electrons some of which are at substantially the same energy as said reading beam electrons and means coupled to said storage target and said second target for energizing said targets at voltages positive with respect to the voltage of the source of said reading beam and for producing a voltage differential between said targets so that the current of said secondary electrons, at substantially the same energy, is determined causing a variable degree of cancellation of said stored electrical signals as said stored signals are read.

9. A device for rapidly storing different electrical signals and rapidly reading said stored signals including an electron storage target with means providing storing and reading beams scanning opposite sides thereof, second target means intercepting said reading beam when said stored signals are read and producing secondary emission, and means coupled to said storage and second target for energizing said targets at voltages positive with respect to the voltage of the source of said reading beam and for varying the voltage differential between said targets so that said secondary emission flows to said storage target cancelling said storage signals to a controlled degree as said stored signals are read.

10. A device for rapidly storing different electrical signals at one scan rate and rapidly reading said stored signals at another scan rate including an electron storage target having one conductive and one non-conductive surface and means providing storing and reading beams such that said storing beam scans said non-conductive surface, second target means for collecting secondary emission from said non-conductive surface when said surface is scanned by said storing beam and for intercepting said reading beam when said stored signals are read and thereupon emitting secondary electrons, and means for energizing said conductive surface and said second target at voltages positive with respect to the source of said reading beam and for varying the voltage differential between said conductive surface and said second target so that at least a portion of said secondary electrons are at an energy level equivalent to said voltage differential and flow to said non-conductive surface cancelling the signals stored thereon to a degree controlled by said means for varying voltage differential as said stored signals are read.

11. An electrical charge storage device including a perforated storage target having an electrically conductive side and a non-conductive side with means providing electron beams for scanning each of said sides, said device comprising second target means with an output coupled thereto for intercepting the portion of the beam scanning said conductive side which passes through said perforated storage target, means for energizing said conductive side and said second target at voltages positive with respect to the source of said beam which scans said conductive side, and means for controlling the voltage differential between said conductive side and said second target so that simultaneously said output produces a signal representative of said stored charge and said stored charge is substantially cancelled in a variable number of scans of said beam scanning said non-conductive side when said voltage differential is varied.

12. An electrical signal storage device comprising a first electrode for storing input electrical signals, means for generating and launching first and second electron beams toward said first electrode, means for periodically deflecting said first and second beams causing said beams to sweep parts of said first electrode, a second electrode for intercepting said first beam electrons which pass through said first electrode, means for modulating said second beam with said input signals whereby said input signals are stored by said first electrode, means coupled to said second electrode for producing output signals representative of said stored signals and means for energizing said second electrode at a potential positive with respect to said first electrode whereby simultaneously said input signals are stored, said output is produced and said stored signals are cancelled.

13. A device for storing and subsequently reading electrical signals including a perforated storage target having an electrical conductive side and a non-conductive side with means providing write and read electron beams, said write beam scanning said non-conductive side and said read beam scanning said conductive side of said storage target, said device comprising second target means disposed to intercept the portion of said read beam which passes through said perforated storage target thereby producing an output signal representative of stored signals, said second target emitting secondary electrons when struck by said portion of said read beam, means for energizing said conductive side and said second target at voltages positive with respect to the source of said read beam so that some of said secondary electrons have energy substantially equal to the voltage differential between said storage and said second target, and means coupled to said device for controlling said voltage differential whereby said stored signals may be cancelled to a controlled degree as said stored signals are read.

14. A storage device for storing electrical signals comprising an electron storage electrode for storing said signals, an electron collector electrode, means for producing writing and reading electron beams, means for causing said beams to scan said electrodes, means for energizing said electrodes at potentials positive with respect to said means for producing said reading beam, and means for producing a voltage differential between said electrodes to thereby erase signals stored on said storage electrode.

15. A storage device for storing electrical signals comprising an electron storage electrode for storing said signals, an electron collector electrode, an output coupled to said collector electrode, means for producing writing and reading electron beams, means for causing said beams to scan said electrodes, means for energizing said electrodes at potentials positive with respect to said means for producing said reading beam, and means for producing a voltage differential between said electrodes to thereby erase said stored signals.

16. A storage device for storing electrical signals comprising an electron storage electrode for storing said signals, an electron collector electrode, means coupling an output from said collector electrode, means for producing writing and reading electron beams for scanning said electrodes producing said output when said reading beam scans said electrodes, means for energizing said electrodes at potentials positive with respect to said means for producing said reading beam, and means for producing a voltage differential between said electrodes to simultaneously erase said signals and produce said output.

17. A storage device for storing electrical signals comprising an electron storage electrode for storing said signals, an electron collector electrode, means coupling an output from said collector electrode, means for producing writing and reading electron beams for scanning said electrodes producing said output when said reading beam scans said electrodes, means for energizing said electrodes at potentials positive with respect to said means for producing said reading beam, and means for decreasing the voltage differential between said electrodes while said electrodes are scanned by said reading beam to increase the flow of electrons to said storage electrode which erase said stored signals.

References Cited in the file of this patent

UNITED STATES PATENTS

| | | |
|---|---|---|
| 2,826,714 | Forgue | Mar. 11, 1958 |
| 2,879,442 | Kompfner | Mar. 24, 1959 |